United States Patent [19]

Giddings et al.

[11] Patent Number: 4,502,965

[45] Date of Patent: Mar. 5, 1985

[54] TERPOLYMERS FOR USE AS HIGH TEMPERATURE FLUID LOSS ADDITIVE AND RHEOLOGY STABILIZER FOR HIGH PRESSURE, HIGH TEMPERATURE OIL WELL DRILLING FLUIDS

[75] Inventors: David M. Giddings, Sugar Land; Donald G. Ries; Allen R. Syrinek, both of Richmond, all of Tex.

[73] Assignee: Nalco Chemical Company, Oak Brook, Ill.

[21] Appl. No.: 530,796

[22] Filed: Sep. 9, 1983

[51] Int. Cl.$^3$ ............................................. C09K 7/02
[52] U.S. Cl. ............................. 252/8.5 C; 252/8.5 A; 526/264
[58] Field of Search ................. 252/8.5 A, 8.5 C; 526/264, 287

[56] References Cited

U.S. PATENT DOCUMENTS

| | | | |
|---|---|---|---|
| 2,718,497 | 9/1955 | Oldham et al. | 252/8.5 |
| 3,629,101 | 12/1971 | Hille et al. | 526/287 X |
| 3,929,741 | 12/1975 | Lasky | 524/916 X |
| 4,048,077 | 9/1977 | Engelhardt et al. | 252/8.5 |
| 4,300,820 | 11/1981 | Shah | 524/516 |
| 4,357,245 | 11/1982 | Engelhardt et al. | 252/8.5 |

*Primary Examiner*—Herbert B. Guynn
*Attorney, Agent, or Firm*—John G. Premo; Robert A. Miller; Donald G. Epple

[57] ABSTRACT

Novel water-soluble terpolymers comprising:

| Ingredients | Mole % |
|---|---|
| 2-acrylamido-2-methylpropane-sulfonic acid, sodium salt (AMPS) | 58–77 |
| N—vinylpyrrolidone | 2–20 |
| acrylonitrile | 4–36 |

These terpolymers provide high temperature fluid loss additives and rheology stabilizers for high calcium-containing brine clay drilling fluids.

2 Claims, No Drawings

TERPOLYMERS FOR USE AS HIGH TEMPERATURE FLUID LOSS ADDITIVE AND RHEOLOGY STABILIZER FOR HIGH PRESSURE, HIGH TEMPERATURE OIL WELL DRILLING FLUIDS

INTRODUCTION

A serious problem is encountered when clay-based oil well drilling fluids are subjected to conditions of high temperature and high pressure in conjunction with utilization of high calcium-containing brines which are used to prepare these drilling fluids. When these conditions exist, conventional drilling fluid polymeric additives such as acrylamide polymers, when used as stabilizers for these fluids, tend to be rendered ineffective.

Recently a partial solution to the problem has been provided by the utilization as a fluid loss additive and rheology stabilizer of terpolymer composed of:

| Ingredients | Mole % |
| --- | --- |
| 2-acrylamido-2-methylpropane-sulfonic acid, sodium salt (AMPS) | 52.0 |
| acrylamide | 32.0 |
| N—methyl-N—vinyl acetamide | 16.0 |

This terpolymer, while proving to be effective as a high temperature fluid loss additive for oil well drilling fluids, has the disadvantage of using in its composition 16.0 mole % of N-methyl-N-vinyl acetamide. This renders the material expensive to use.

If it were possible to use a polymeric high temperature fluid loss additive and rheology stabilizer that was resistant to high calcium-containing brines, an improvement in the art would be afforded.

THE INVENTION

The invention comprises the utilization of terpolymers with the following composition:

| Ingredients | Mole % Preferred | Mole % General |
| --- | --- | --- |
| 2-acrylamido-2-methylpropane-sulfonic acid, sodium salt (AMPS) | 58.9 | 58–77 |
| N—vinylpyrrolidone | 08.3 | 2–20 |
| acrylonitrile | 32.8 | 4–36 |

As will be shown hereafter, these terpolymers provide excellent high temperature fluid loss protection to a clay-based brine prepared drilling fluid.

These terpolymers may be prepared in accordance with the following preparative technique, illustrating the preparation of the preferred terpolymer listed above:

A polymerization vessel was fitted with a stirrer, thermometer, condenser and addition port. The vessel was charged with 325 g of water, 53 g of AMPS, 21 g of a 50% solution of sodium hydroxide, 21 g of a 50% solution of sodium hydroxide, 4 g of N-vinylpyrrolidone and 7.6 g of acrylonitrile. The pH was adjusted to 8.3 and the polymerization was initiated by the sequential addition of 10 ml. of a 0.5% solution of sodium bisulfite and 10 ml. of a 0.5% solution of ammonium persulfate. After two hours reaction time, the temperature was raised to 75° C. and 10 ml of a 2% solution of sodium bisulfite and 10 ml of a 2% solution of ammonium persulfate was added. The reaction was heated for one hour before cooling to room temperature. The polymer solution had a Brookfield viscosity of 2940 cps.

The amount of polymer used to stabilize clay-based drilling fluids under conditions of high temperature and pressure may vary between about 10% up to 60% by weight based on the clay present in the fluid.

The polymers may be further characterized as having a molecular weight below 1,000,000. Preferably, they have a molecular weight within the range of 10,000–500,000.

To illustrate the invention, the preferred composition shown above was tested in a high temperature, high pressure fluid loss additive test which is described in detail in the American Petroleum Institute publication, RP13B.

The particular drilling fluid tested contained 15 pounds/barrel of a pre-hydrated Bentonite drilling fluid clay and a 50% dilution of a brine known as a Williston Basin brine. This brine contained a substantial amount of calcium.

The blank test produced a filtrate of 42 ml/7.5 min.

The preferred composition of the invention was added to provide 6 pounds/barrel of active polymer. This provided an approximate dosage of 40% by weight active polymer based on active clay. At the end of 30 minutes, the fluid loss in the above described test was 22 ml.

Using the same preparative technique and test method for determining fluid loss additive effectiveness, the following additional polymers were prepared and tested:

| Monomer Mole % | | | HTHP |
| AMPS | NVP* | ACN** | Fluid Loss |
| --- | --- | --- | --- |
| 58.9 | 8.3 | 32.8 | 22 ml. |
| 62.0 | 2.3 | 35.7 | 48 ml. |
| 76.5 | 19.3 | 4.1 | 47 ml. |

*NVP = N—vinylpyrrolidone
**ACN = acrylonitrile

We claim:

1. A method of improving high temperature fluid loss and rheology stabilization of high calcium brine clay-containing oil well drilling fluids which comprises adding thereto a stabilizing amount of a water-soluble terpolymer comprising:

| Ingredients | Mole % |
| --- | --- |
| 2-acrylamido-2-methylpropane-sulfonic acid, sodium salt | 58–77 |
| N—vinylpyrrolidone | 2–20 |
| acrylonitrile | 4–36 | and said terpolymer being further characterized as having a molecular weight below 1,000,000.

2. A method of improving high temperature fluid loss and rheology stabilization of high calcium brine clay-containing oil well drilling fluids which comprises adding thereto a stabilizing amount of a water-soluble terpolymer comprising:

| Ingredients | Mole % |
| --- | --- |
| 2-acrylamido-2-methylpropane-sulfonic acid, sodium salt | 58.9 |
| N—vinylpyrrolidone | 08.3 |
| acrylonitrile | 32.8 | and said terpolymer being further characterized as having a molecular weight below 1,000,000.